US009010197B1

(12) United States Patent
Liu

(10) Patent No.: US 9,010,197 B1
(45) Date of Patent: Apr. 21, 2015

(54) SYSTEM FOR AMPLIFYING FLOW-INDUCED VIBRATION ENERGY USING BOUNDARY LAYER AND WAKE FLOW CONTROL

(71) Applicant: The United States of America as represented by the Secretary of the Navy, Washington, DC (US)

(72) Inventor: Wayne P. Liu, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 193 days.

(21) Appl. No.: 13/926,580

(22) Filed: Jun. 25, 2013

Related U.S. Application Data

(63) Continuation-in-part of application No. 12/886,737, filed on Sep. 21, 2010, now abandoned.

(51) Int. Cl.
*G01F 1/32* (2006.01)
*F15D 1/00* (2006.01)

(52) U.S. Cl.
CPC .................................... *F15D 1/002* (2013.01)

(58) Field of Classification Search
None
See application file for complete search history.

(56) References Cited

U.S. PATENT DOCUMENTS

| | | | |
|---|---|---|---|
| 5,150,619 | A | 9/1992 | Turner et al. |
| 6,675,661 | B1 | 1/2004 | Peters |
| 7,007,556 | B2 | 3/2006 | Keita et al. |
| 2009/0250129 | A1 | 10/2009 | Bernitsas et al. |

OTHER PUBLICATIONS

Liu, Wayne P. and Brodie, George H., "A demonstration of MEMS-based active turbulence transitioning", Int. Journal of Heat and Fluid Flow, Feb. 2000, pp. 297-303, vol. 21, Elsevier.

*Primary Examiner* — Harshad R Patel
(74) *Attorney, Agent, or Firm* — SPAWAR Systems Center Pacific; Kyle Eppele; Ryan J. Friedl

(57) ABSTRACT

A system includes a body disposed in a flow field and a flow disturbance device configured to induce tuned and controlled flow fluctuations in the flow field that are coupled into and amplified by a boundary layer of the body and the flow field. The flow disturbance device is located on, within, or separated from the body. The body may be a bluff body or an airfoil and may be cylindrical in shape. The flow field is a fluid or plasma having a sub-critical flow rate. The flow disturbance device may be stationary or vibrating. The flow fluctuations are tuned to a frequency within an instability frequency band of the boundary layer. The frequency band may be a frequency band that naturally amplifies the flow fluctuations and alters the body's downstream vortex shedding pattern such that vortex-induced vibration characteristics experienced by the body are increased.

13 Claims, 10 Drawing Sheets

SYSTEM FOR AMPLIFYING FLOW-INDUCED VIBRATION ENERGY USING BOUNDARY LAYER AND WAKE FLOW CONTROL

CROSS-REFERENCE TO RELATED APPLICATIONS

This application is a continuation-in-part of U.S. patent application Ser. No. 12/886,737, filed on Sep. 21, 2010, entitled "System for Amplifying Flow-Induced Vibration Energy Using Boundary Layer and Wake Flow Control," the entire content of which is fully incorporated by reference herein.

FEDERALLY-SPONSORED RESEARCH AND DEVELOPMENT

The System for Amplifying Flow-Induced Vibration Energy Using Boundary Layer and Wake Flow Control is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email ssc_pac_T2@navy.mil. Reference Navy Case Number 102560.

BACKGROUND

The 21$^{st}$ century has seen a great interest in the production of renewable energy. Harnessing wind or ocean current driven flow vibrations has been one approach for creating renewable energy, with various devices being developed to achieve such results. One such device attempts to harness wind or ocean current flow vibrations by using a bluff body having a specified surface roughness thereon, by the use of specifically sized sandpaper strips along the lengthwise span and circumference of the cylinder. Such method has several drawbacks, such as the ability of the sandpaper to lose its roughness due to the fluid flow and the requirement for the sandpaper to be located at carefully chosen points along the cylinder to produce the desired vibration amplification effects.

Further, the surface roughness method is undesirable as it fails to: a) exploit the ability of a boundary layer to naturally select and amplify flow disturbances that match its own instability frequency band and/or b) control or influence vortices after they have been shed from a bluff body. Surface roughness serves primarily to introduce random turbulent fluctuations that can trigger or accelerate the onset of flow transition. It is not a controllable flow fluctuation source that can deliver specifically tuned disturbances that can be coupled into and be amplified by the instability frequency band of the boundary layer. A need exists for an energy harvesting system that overcomes the aforementioned drawbacks.

DETAILED DESCRIPTION OF SOME EMBODIMENTS

The embodiments of the invention disclosed herein relate to a system that provides greater flow or vortex induced vibrations (VIV) for applications including energy harvesting. The embodiments enable the unique sustainment and existence of cylinder vortex shedding (typically found in sub-critical laminar flows where the Reynolds number is less than 150,000) within a transitional boundary layer flow (with Reynolds number flows of 150,000 to 3,500,000) by applying flow perturbations tuned to the instability frequencies of the boundary layer of the body and/or a vortex wake. Since transitional boundary layer flows typically feature greater surface pressures and increased flow attachment (delayed separation), the novel existence of highly periodic vortex shedding within this flow regime will lead to greater oscillatory forces on the cylinder (via increased oscillatory surface pressures and flow attachment areas) and thus increased VIV displacements.

Unlike previous systems, the embodiments of the invention discussed herein provide for vortex shedding within transitional boundary layer flows that can exploit the increased surface pressures and flow attachment for greater VIV.

Figure 1:
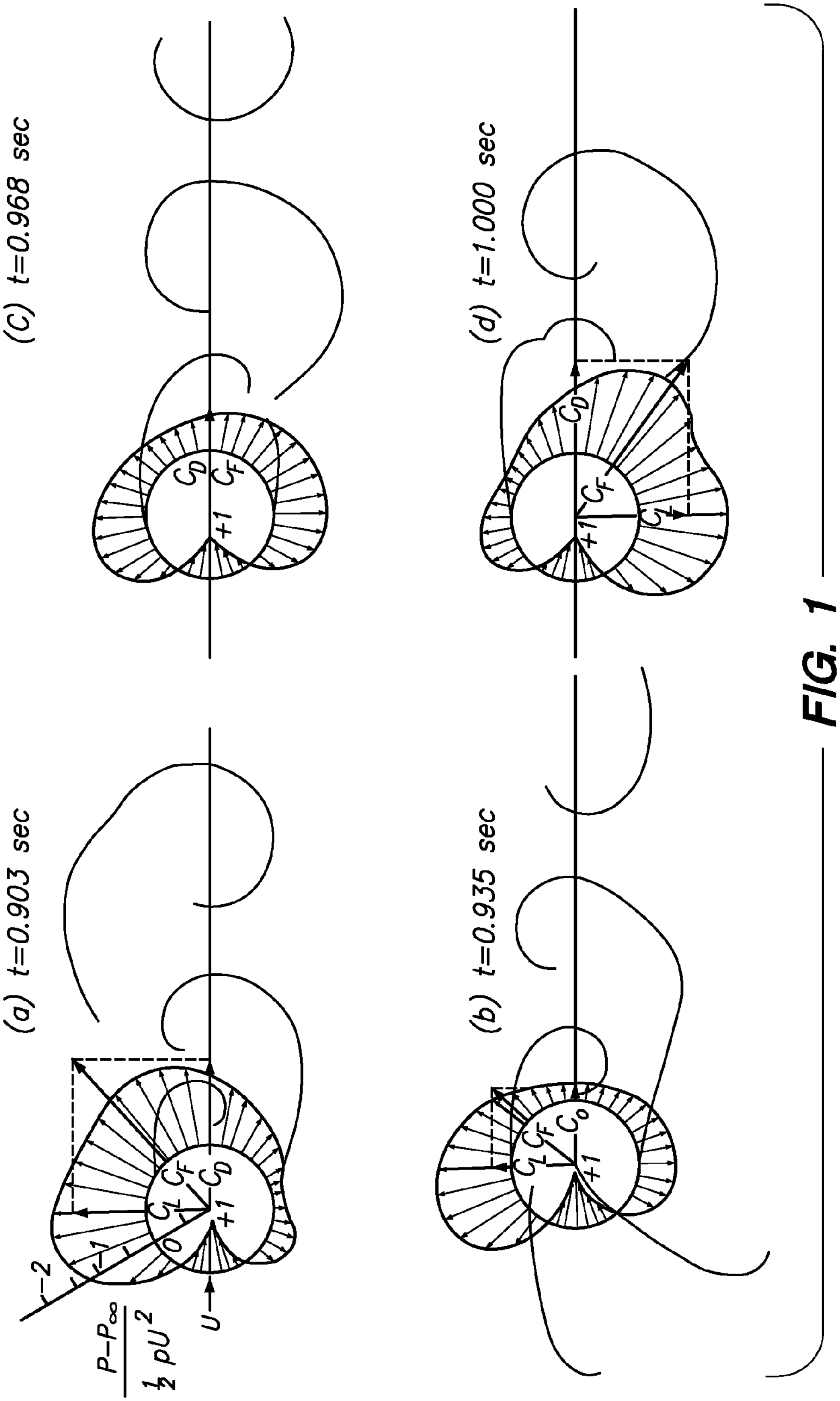
FIG. 1 shows a diagram of a sequence of simultaneous surface pressure fields and wake forms at a Reynolds number of 112000 for approximately one-third of one cycle of vortex shedding.

A structure's wake vortex shedding is often responsible for the side to side or lateral vibration of structures exposed to cross-flow. This lateral vibration is due to an alternating and asymmetric pressure field about the structure which results in a highly periodic forcing imposed upon the structure, as shown in FIG. 1. The oscillating imbalance of cylinder surface pressures results from continuously alternating regions of attached and then separated flow about the cylinder; the frequency of this alternating surface pressure field can be determined by the Strouhal relationship of Frequency (F)× Cylinder Diameter (D)/Flow velocity (V)=0.20. Vortex shedding that is typically found in sub-critical laminar flows is characterized by a flow separation about the cylinder at about 80 degrees downstream of the stagnation point, see FIG. 2, and lower surface pressures about the cylinder circumference, see FIG. 3, particularly the pressure curve for Re=200,000.

Figure 3:
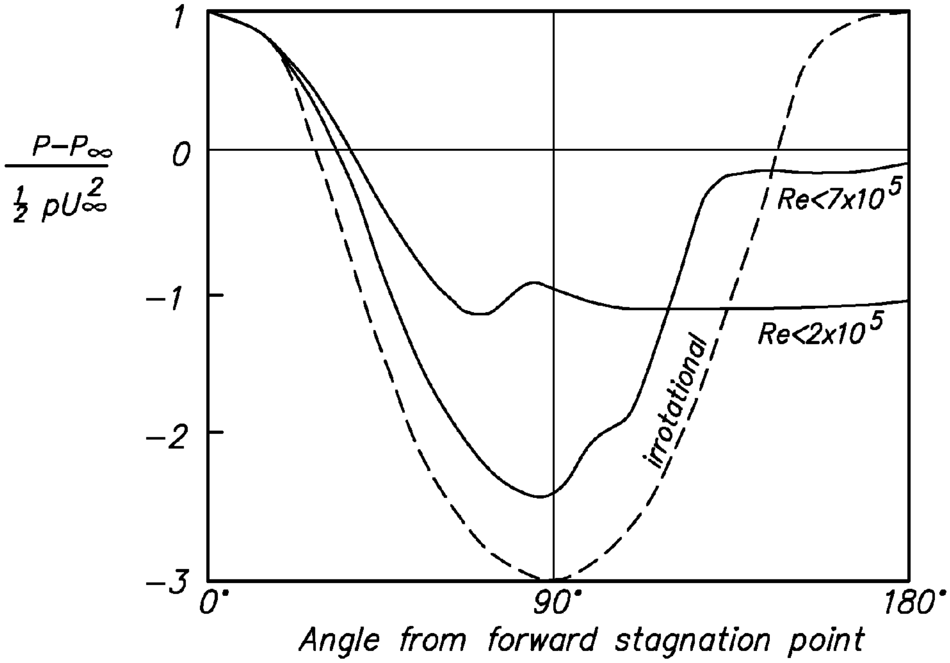
FIG. 3 shows a graph of a surface pressure distribution around a circular cylinder at sub-critical and super-critical Reynolds numbers.
Figure 4:
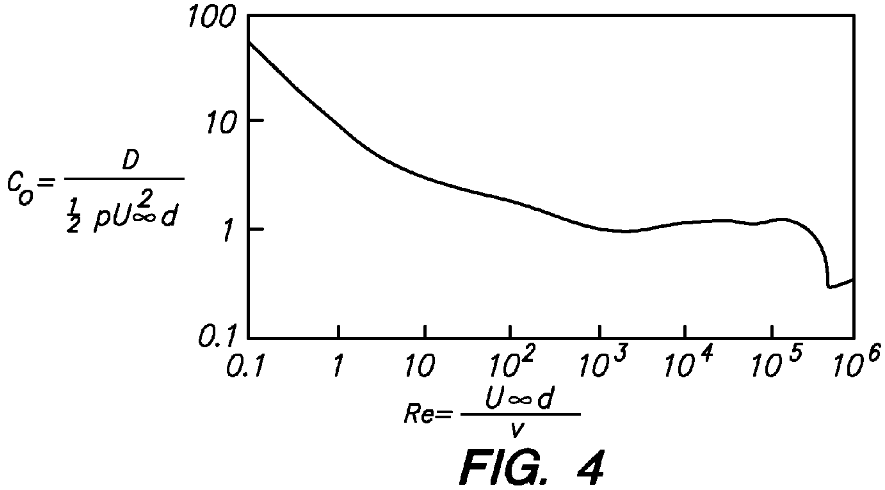
FIG. 4 illustrates the measured drag coefficient of a circular cylinder.

The embodiments of the invention discussed herein show that it is possible to increase structure VIV by controllably inducing boundary layer transition through flow disturbances that are introduced at a frequency within the boundary layer's band of instability frequencies. Boundary layer transition (from a sub-critical laminar condition to turbulent states) is typically characterized by a resultant increase in the surface pressure about the cylinder circumference (for example see FIG. 3, particularly the pressure curve for Re=700,000), extension of attached flow (i.e. delay of separation) upon which the greater surface pressures can act upon (see FIG. 2, particularly the turbulent boundary layer at Re=300,000), and drag reduction effect (see FIG. 4).

Boundary layer transition is often intentionally performed in model-scale testing and golf ball design to achieve a turbulent boundary layer flow and subsequent drag reduction at slow speed or sub-critical flows when laminar boundary layer and separation characteristics would dominate. Application of grit, trip wires or surface roughness effects (dimples, sandpaper) are techniques for "tripping" the boundary layer or instantaneously transitioning the flow from laminar to turbulent states for drag reduction.

As shown in U.S. Pat. No. 8,047,232 to Bernitsas et al., surface roughness patches are selectively placed about the cylinder to transition the boundary layer and increase VIV displacement amplitudes. As discussed above, surface roughness introduces turbulent flow fluctuations within the boundary layer to transition the flow and represents an almost random and on/off approach towards achieving boundary layer transition.

Figure 5:
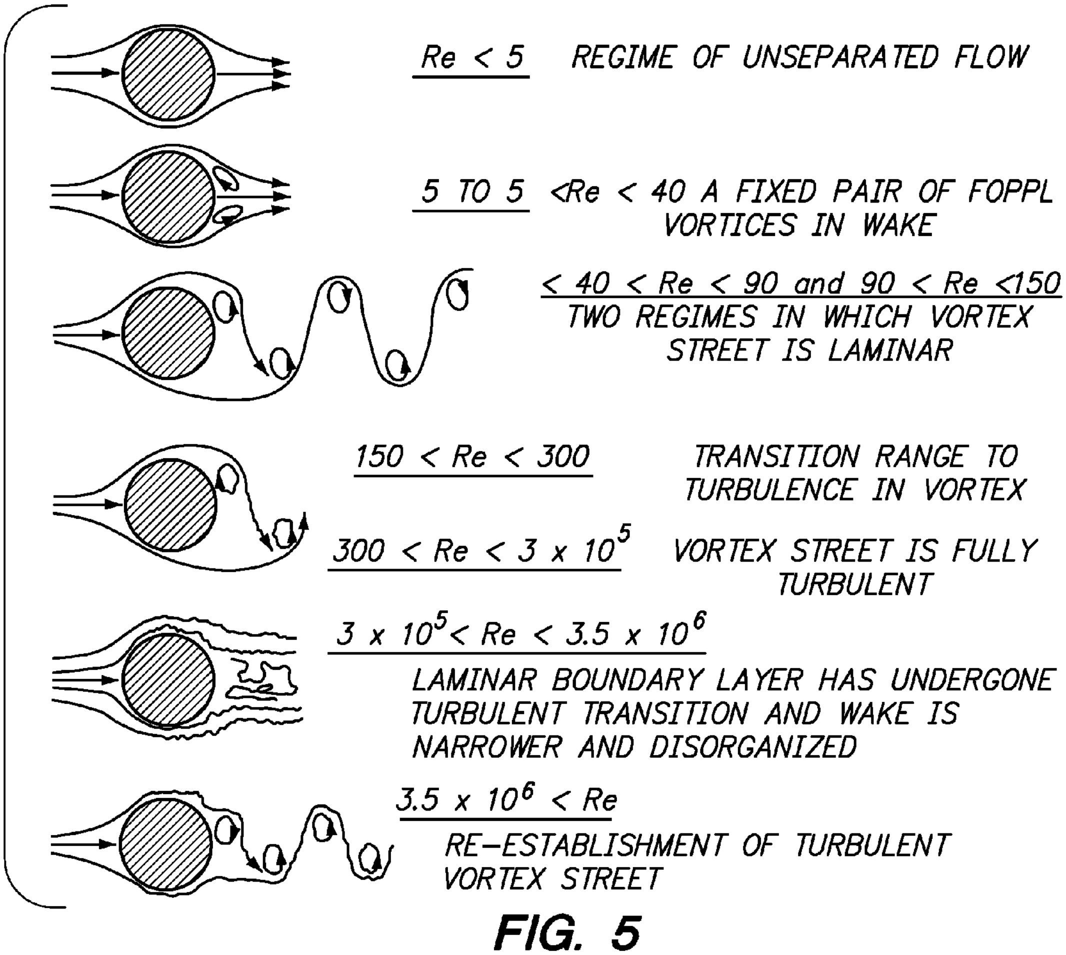
FIG. 5 shows a diagram illustrating the fluid flow across smooth circular cylinders for various ranges of Reynolds numbers.

Yet, Bernitsas' success in amplifying VIV by transitioning the boundary layer would appear to conflict with longstanding vortex shedding research which suggests that a transitional boundary layer in Reynolds number flows of 3.0×10^5 to 3.5×10^6 (see FIG. 5) would essentially disrupt the highly periodic shedding process to dilute the spectral energies focused about the vortex shedding frequencies and essentially reduce VIV magnitudes.

In contrast to Bernitsas' surface roughness approach, the embodiments of the invention show that boundary layer transition and increased VIV can be achieved using a highly controllable input of flow disturbances that are tuned to the boundary layer's instability frequency band. When flow fluctuations are introduced or injected into the boundary layer at a frequency within the instability frequency band, the flow fluctuations become naturally amplified by the boundary layer and transition the flow from a sub-critical, well behaved laminar state to a turbulent condition (i.e., has large flow fluctuations). Boundary layer flow fluctuations that occur at a rate outside of this instability frequency band are damped out and naturally dissipate. Thus the instability frequencies of a boundary layer represent a self-selecting mechanism that can damp out or amplify flow fluctuations depending on the fluctuation (disturbance) frequency.

As an example, as discussed in "A demonstration of MEMS-based Active Turbulence Transitioning" by Liu et al, *Int. J. Heat and Fluid Flow,* 21 (2000) 297-303, the entire content of which is incorporated by reference herein, acoustically driven flow perturbations tuned to the instability frequency (~275 Hz) of a cylinder in sub-critical flow (Reynolds number=25,000) are introduced to the cylinder's boundary layer at the surface, just at the flow separation point of 79 degrees (see FIG. 6A). Downstream of this insertion point, the flow perturbations are naturally amplified to transition the flow into turbulence and even resuscitate and extend sinusoidal vortex shedding features to 119 degrees (compare to signals at 76 and 79 degrees). This transition to turbulence also delays separation (from 79 to 119 degrees downstream of stagnation) and achieves drag reduction for the cylinder, as shown by the increase of flow speed in the wake of cylinder (wake velocity) when flow forcing is effected (see FIG. 7).

Figure 6:
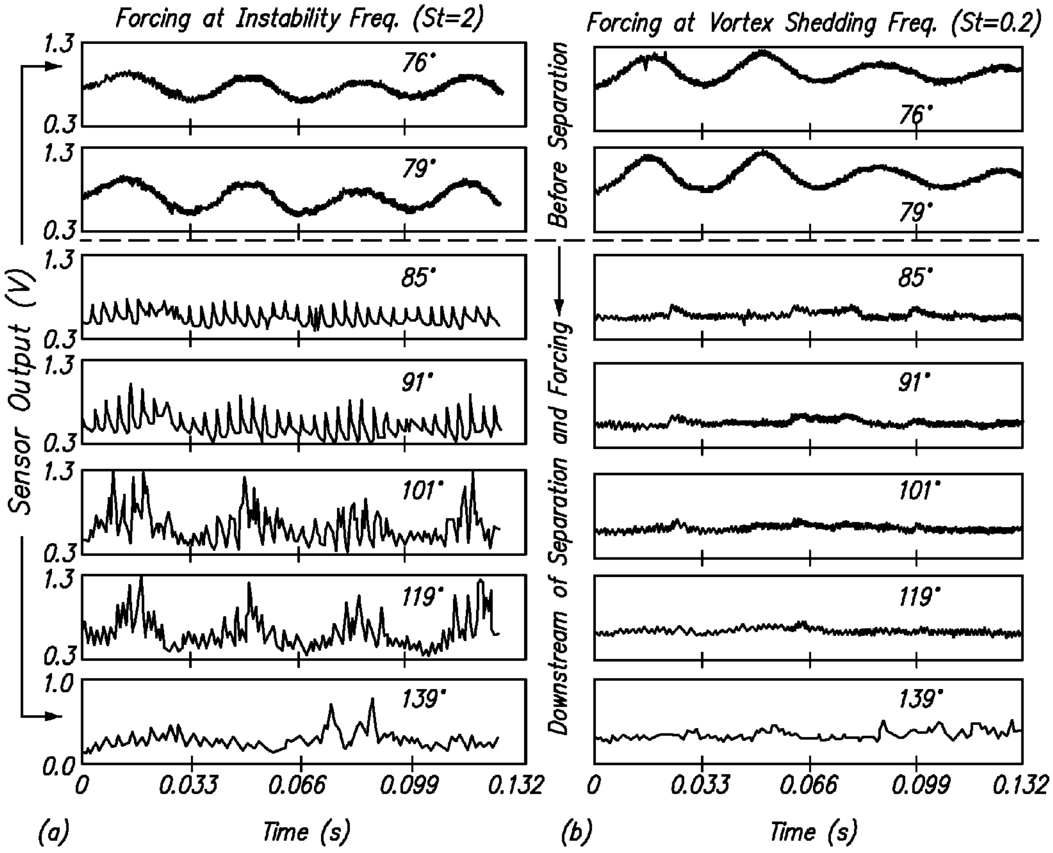
FIG. 6A shows time traces of shear stress sensors on a cylinder with forcing at 82 degrees from stagnation with an instability frequency of 275 Hz with a Strouhal number of 2 and a flow Reynolds number of 25,000 (sub-critical flow).
FIG. 6B shows time traces of shear stress sensors on a cylinder with forcing at 82 degrees from stagnation with a vortex shedding frequency of 27 Hz with a Strouhal number of 0.2 and a flow Reynolds number of 25,000 (sub-critical flow).
Figure 7:
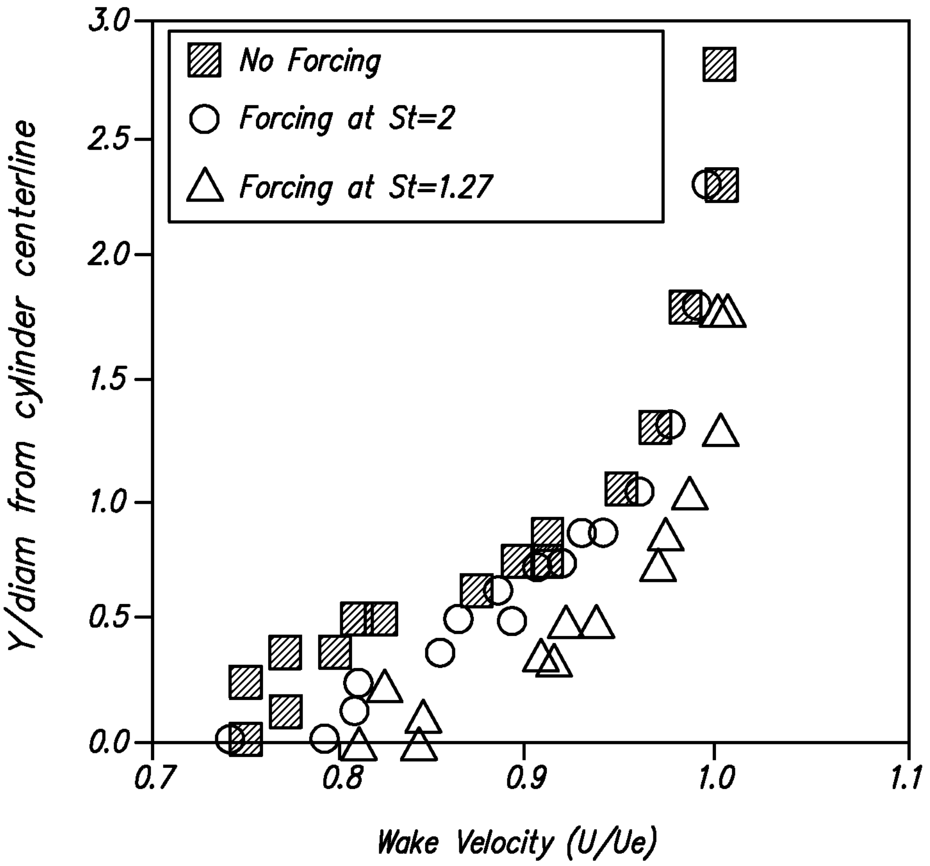
FIG. 7 illustrates the wake profile of a cylinder with and without flow forcing.
Figure 8:
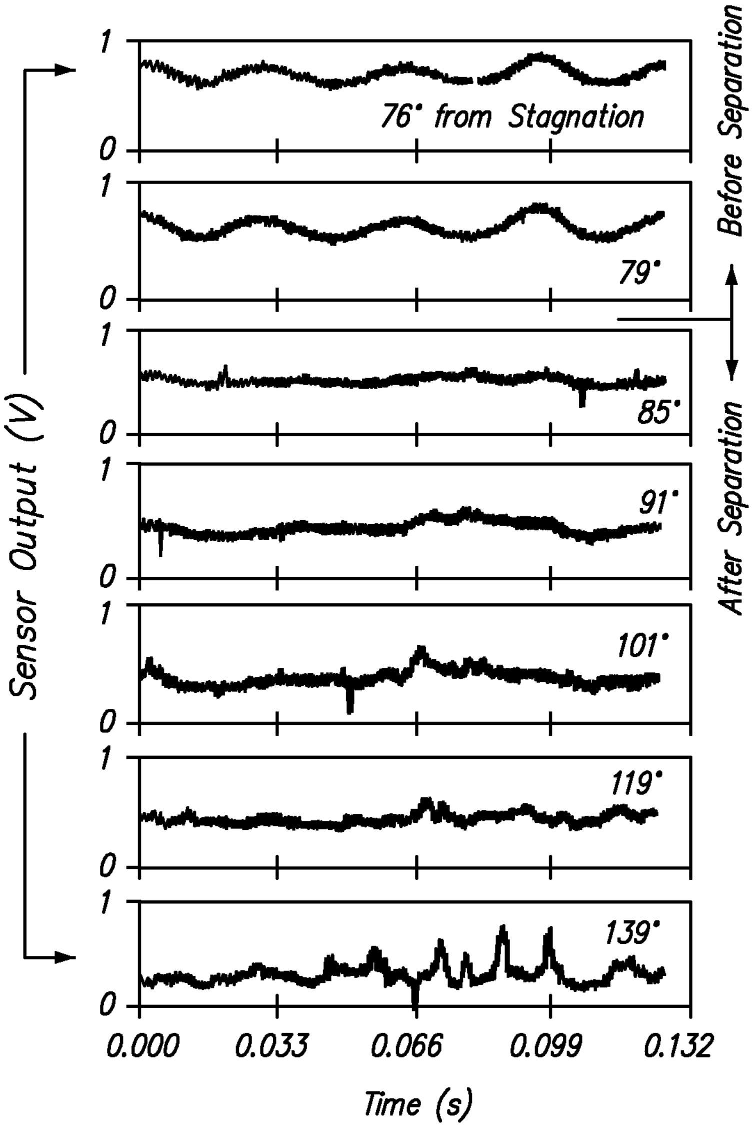
FIG. 8 shows time histories of shear stress sensor outputs about a cylinder with no forcing at a Reynolds number of 25,000 (sub-critical flow).

FIG. 6B shows that when flow disturbances are improperly tuned to a frequency (27 Hz) that falls outside the instability frequency band of the boundary layer, a complete absence of the flow disturbance amplification and vortex shedding traces can be seen downstream of the input point (79 degrees). This mirrors the typical or baseline flow conditions for a cylinder in sub-critical flow without flow disturbances inputs (see FIG. 8). Thus, by inputting flow disturbances that are properly tuned to the instability frequencies, a unique coexistence of transitional boundary layer flow and highly regular vortex shedding characteristics can be achieved where vortex shedding is resuscitated and even extended well beyond the typical flow separation point (from 79 degrees to 119 degrees).

Figure 9:
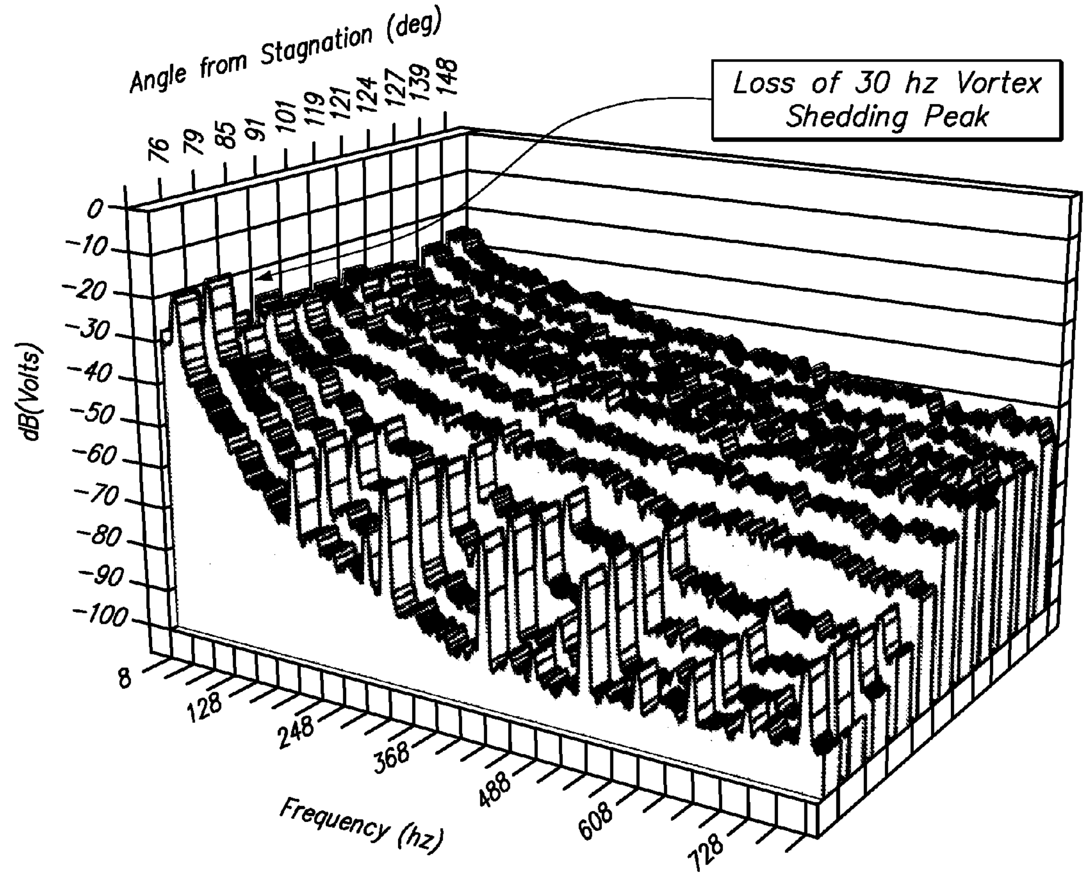
FIG. 9 shows a graph of spectral analysis of shear stress sensor outputs about a cylinder perimeter without forcing and a Reynolds number of 25,000.
Figure 10:
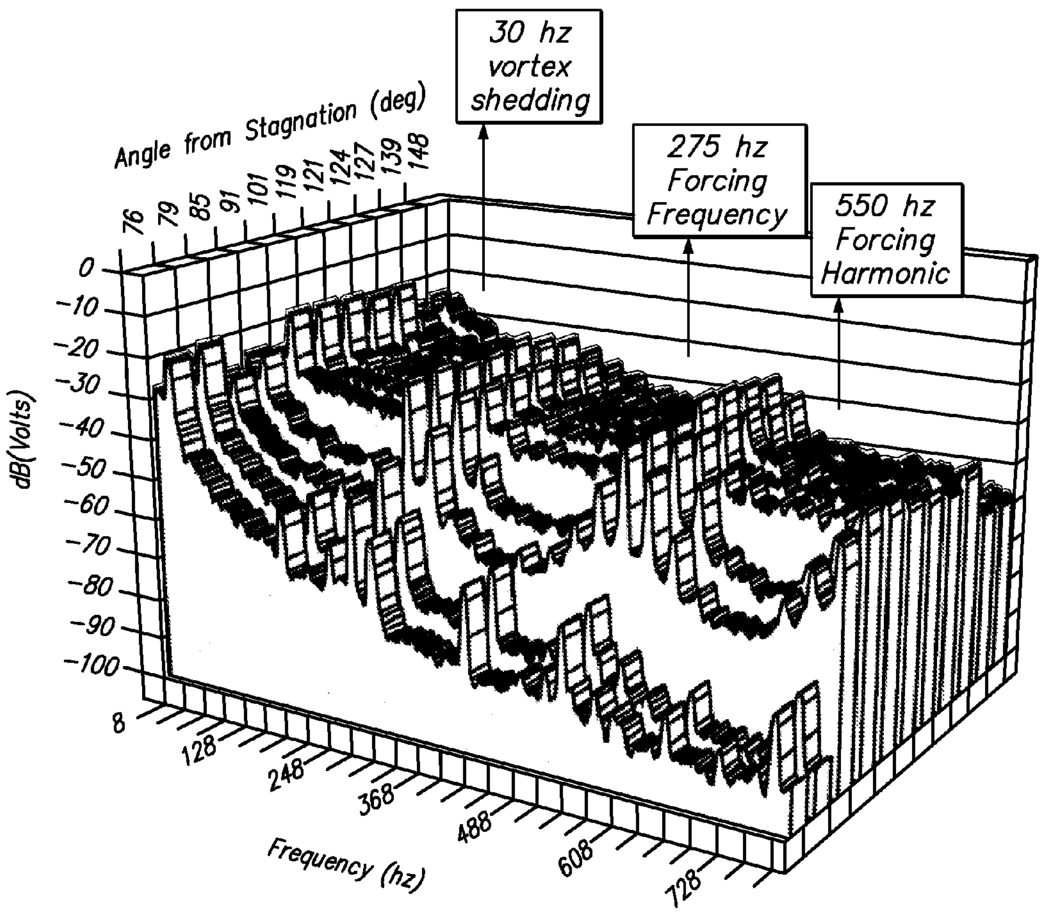
FIG. 10 shows a graph of spectral analysis of shear stress sensor outputs about a cylinder perimeter with forcing at an instability frequency of 275 Hz with a Strouhal number of 2 and a Reynolds number of 25,000.

This is further underscored in FIGS. 9 and 10 which compare the spectral energies about the cylinder without and with tuned flow disturbances, respectively. FIG. 9 presents typical sub-critical flow characteristics of a cylinder and shows a clear loss of the vortex shedding peak frequency exists beyond the separation point (79 degrees).

However, FIG. 10 shows that the 30 Hz vortex shedding peak is prominently extended well past the typical flow separation point of 79 degrees (angle from stagnation point) with tuned flow perturbations and clearly conflicts with the long-standing view that vortex shedding and its strong, organized spectral peaks are absent in transitional flow. The embodiments of the system disclosed herein demonstrate that when the boundary layer is coupled to flow disturbances that are tuned to the boundary layer's instability frequency, one can achieve highly regular vortex shedding characteristics that are typically absent in transitional boundary layer flows.

As shown in FIG. 1, vortex shedding is directly responsible for the alternating pressure fields about a cylinder in flow that lead to the VIV. When vortex shedding in a transitional boundary layer is coupled with the increased surface pressures and flow attachment that are concomitant with transitional flows, greater lateral forces can be achieved to increase VIV amplitudes for applications including energy harvesting of ocean and wind currents.

The embodiments of the invention utilize an active or passive flow disturbance device (FDD) to introduce into the cylinder's boundary layer, flow perturbations tuned to the boundary layer's instability frequency. Acoustic, mechanical, electrical or other methods may be used to generate these flow pertubations. Even VIVs shed from a first or upstream cylinder or wire in flow can be tuned to deliver flow disturbances that fall within the instability frequency band of a second or downstream cylinder.

Figure 11:
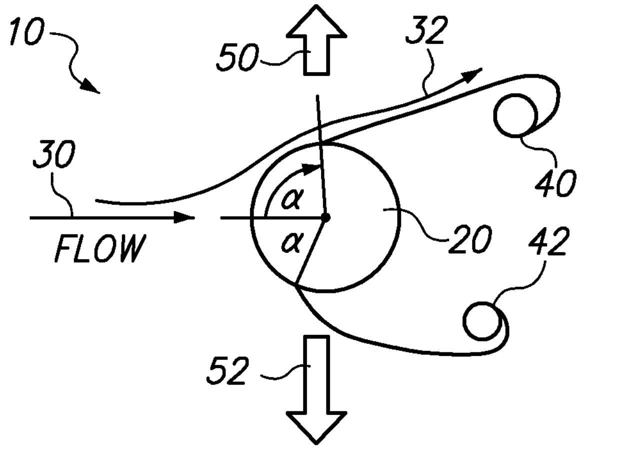
FIG. 11 shows a diagram of a body disposed in a flow field.

FIG. 11 shows a diagram of a system 10 including a body 20 disposed in a flow field 30. As flow field 30 encounters body 20, the flow is disturbed as shown by line 32. The resulting flow causes downstream vortices 40 and 42 to be shed from body 20 at a laminar separation point, α. The intensity, pattern, position and proximity of the shed vortices 40 and 42 affect the amplitudes of the vortex induced vibrations, represented by arrows 50 and 52 respectively.

Figure 12:
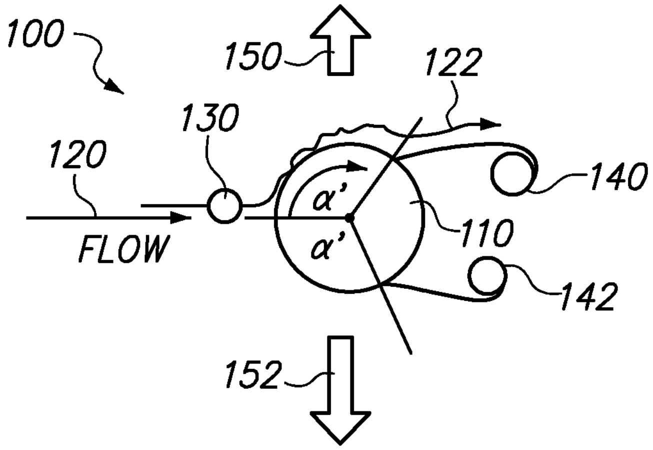
FIG. 12 shows a diagram of a body disposed in a flow field, with a flow disturbance device located upstream from the body, in accordance with the System for Amplifying Flow-Induced Vibration Energy Using Boundary Layer and Wake Flow Control.

FIG. 12 shows a diagram of a system 100 including a body 110 disposed in a flow field 120, with a FDD 130 located upstream from body 110, in accordance with the System for Amplifying Flow-Induced Vibration Energy Using Boundary Layer and Wake Flow Control. Body 110 and/or FDD 130 may comprise any type of body such as a bluff body, or an airfoil, cable, or stretched membrane. Body 110 and/or FDD 130 may also be cylindrical, with a circular, D-shaped, triangular, square or otherwise polygonal cross-section or may comprise other shapes as would be recognized by one having ordinary skill in the art.

Flow field 120 may comprise a fluid, plasma, or other flow field. Prior to encountering FDD 130, flow field 120 may comprise a flow which yields a sub-critical or laminar flow boundary layer about body 110. Flow field 120 may initially be a laminar flow. In the sub-critical range, laminar boundary layers separate at about 80 degrees aft of the nose of a cylindrical body and the vortex shedding is strong and periodic. After encountering FDD 130, flow field 120 transitions to turbulent flow within the boundary layer of body 110. When transitioned, flow field 120 may have higher flow fluctuations to mimic a flow field with a higher Reynolds number between about 150000 and about 3500000. In transition, laminar separation bubbles and three-dimensional effects disrupt and confuse the regular shedding process and reduce the concentration of spectral energy at the vortex shedding frequency.

In some embodiments, FDD 130 is a stationary FDD. In other embodiments, FDD 130 may be an oscillating device, a vibrating device, an acoustic device or a resonating device. In some embodiments FDD 130 may be electronically controlled by operatively connecting a controller thereto.

Figure 2:
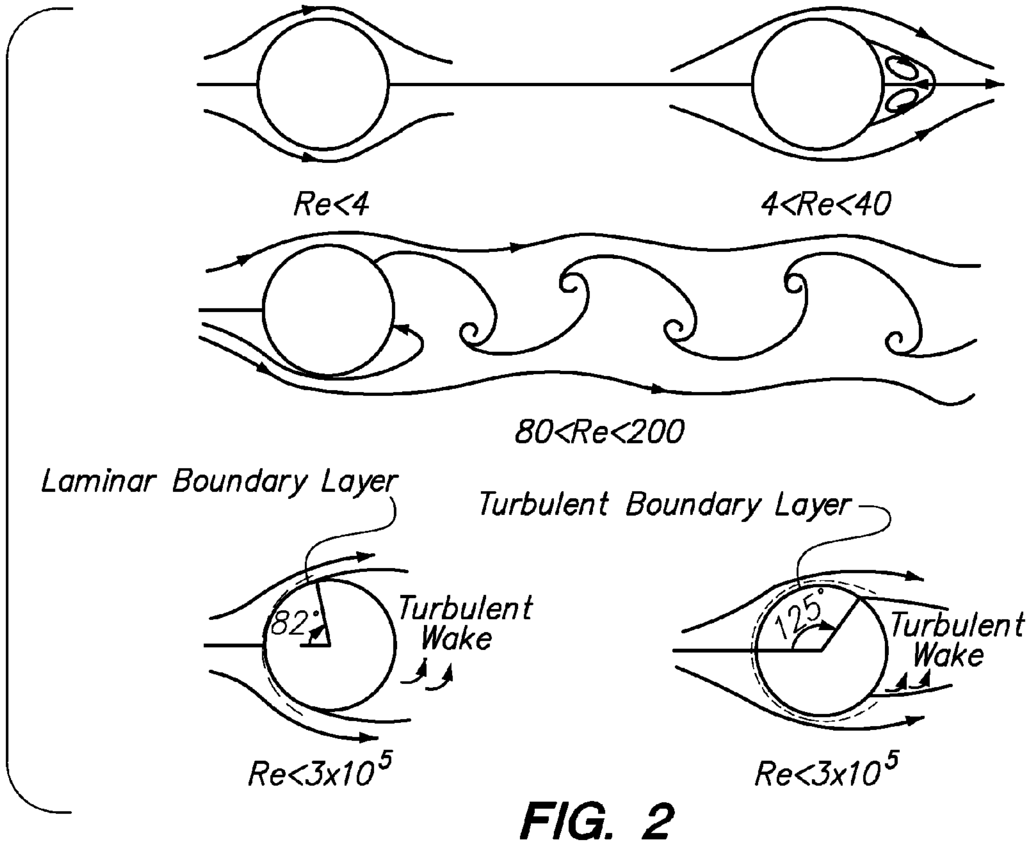
FIG. 2 shows examples of flow over a circular cylinder for various ranges of Reynolds numbers.

As shown in FIG. 2, FDD 130 is separated from and located upstream to body 110. In some embodiments, FDD 130 may be fixed in location, independent of body 110. As an example, FDD 130 may be a screen or trip wire fixed within flow field 120, such as by being tethered to the ground or a fixed object.

In some embodiments, FDD 130 may be an actively tuned element, such as a vibrating wire or membrane, fixed within flow field 120. In other embodiments, FDD 130 may be fixed in relation to body 110. For example, FDD 130 may be a trip wire tethered to body 110 such that FDD 130 moves within flow field 120 along with body 110.

FDD 130 is configured to induce tuned flow fluctuations in flow field 120 that are coupled into and are naturally amplified by a boundary layer of body 110 and flow field 120. These flow fluctuations can be actively controlled by tuning with an electronic device or specifically sizing FDD 130 to passively cast disturbances of a known frequency within the instability frequency band of the boundary layer. Passive methods to create the flow disturbances may include sizing the FDD according to flow velocity to shed vortices at a rate which matches an instability frequency of the boundary layer of body 110. As an example, for a cylindrical body 110 in a flow field, the simple Strouhal formula can be used to determine frequency of shed vortices (serving as flow disturbances) for a given body diameter and flow field velocity:

$$\frac{f \times D}{V} = 0.20$$

where f is the vortex shedding frequency, D is the diameter of FDD 130, and V is the flow velocity of flow field 120. Using the relation, one can also readily determine the proper diameter of FDD 130 required to generate a desired disturbance frequency for any given flow velocity. This passive flow disturbance creation method requires one to select a disturbance frequency to be targeted.

Active flow disturbances tuned to one of the instability frequencies can be imparted by a trip wire, thin membrane, or any other FDD, by a shaker, electric motor, speaker, or piezo-based element. An active flow disturbance creation approach allows for highly variable and adaptive tuning capabilities.

The flow fluctuations are amplified by boundary layer instabilities to increase VIV characteristics experienced by body 110. In some embodiments, the frequency band is a broad range of frequencies that naturally amplifies the flow fluctuations and/or alters the body's downstream vortex shedding pattern such that VIV characteristics experienced by body 110 are increased.

FIG. 12 shows that by imparting controlled flow perturbations with upstream FDD 130, boundary layer instabilities can be triggered to alter the vortex wake pattern (e.g. existence, size, intensity, and pattern of shed vortices 140 and 142) which may delay the flow separation to points α' (as opposed to only α in FIG. 11) and increase oscillatory lateral forces imposed on the structure. Thus, the ability to control the flow perturbations from FDD 130 allows for the ability to amplify the displacement of VIVs represented by arrows 150 and 152, respectively.

FDD 130 is positioned in proximity to body 110 such that flow disturbances created by FDD 130 are coupled into or received by the boundary layer of body 110. Based upon the size and shape of body 110 and FDD 130, the vortex shedding frequency, and the flow field velocity, the distance between body 110 and FDD 130 can be determined so that the disturbances created by FDD 130 are coupled into the boundary layer of body 110. FDD 130 should be placed near body 110 such that the downstream vortices of FDD 130 are not dissipated prior to entering the boundary layer of body 110. This relative distance between FDD 130 and body 110's boundary layer is generally less than about ten diameters of FDD 130.

Figure 13A:
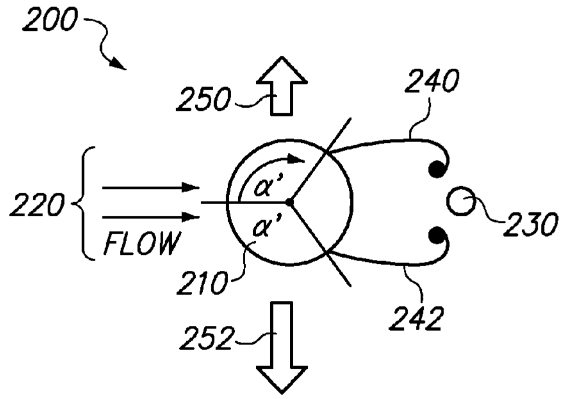
FIG. 13A shows a diagram of a body disposed in a flow field, with a flow disturbance device located downstream from the body, in accordance with the System for Amplifying Flow-Induced Vibration Energy Using Boundary Layer and Wake Flow Control.
Figure 13B:
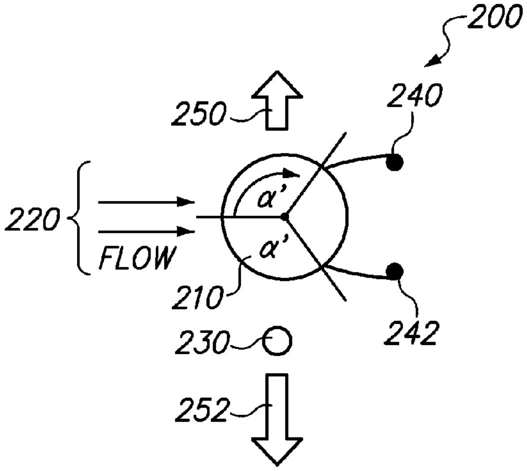
FIG. 13B shows a diagram of a body disposed in a flow field, with a flow disturbance device located transverse to the body, in accordance with the System for Amplifying Flow-Induced Vibration Energy Using Boundary Layer and Wake Flow Control.

Referring to FIGS. 13A and 13B, FIG. 13A shows a diagram of a system 200 including a body 210 disposed in a flow field 220, with a FDD 230 located downstream from body 210, while FIG. 13B shows a diagram of a system 200 including a body 210 disposed in a flow field 220, with a FDD 230 located transverse to body 210, in accordance with the System for Amplifying Flow-Induced Vibration Energy Using Boundary Layer and Wake Flow Control. In some embodiments, FDD is configured similarly as FDD 130.

FIGS. 13A and 13B show that by imparting controlled flow perturbations with device 230, the vortex wake pattern (existence, size, intensity, and pattern of the shed vortices 240 and 242) can be altered, by triggering boundary layer instabilities, which may delay the flow separation to points α' (as opposed to only α in FIG. 11) and increase oscillatory lateral forces imposed on the structure. The ability to control the flow perturbations from device 230 allows for the ability to control or influence vortex wake patterns to amplify the displacement of vortex-induced vibrations represented by arrows 250 and 252, respectively.

Figure 14:
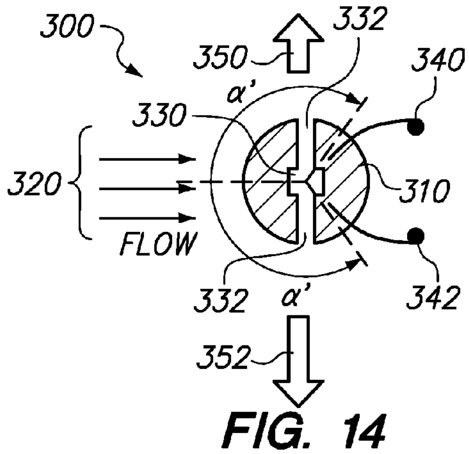
FIG. 14 shows a cross-section view of a body disposed in a flow field, with a flow disturbance device located within the body, in accordance with the System for Amplifying Flow-Induced Vibration Energy Using Boundary Layer and Wake Flow Control.

FIG. 14 shows a cross-section view of a system 300 including a body 310 disposed in a flow field 320, with a FDD 330 located within body 310, in accordance with the System for Amplifying Flow-Induced Vibration Energy Using Boundary Layer and Wake Flow Control. In such configuration, flow disturbances can be imparted directly from the surface of body 310 or from a cavity within body 310 leading to the boundary layer by way of an exposed slot 332 to create coupling and amplification of the disturbances directly within the boundary layer. In some embodiments, slot 332 may be replaced by a channel or hole. FDD 330 may be a vibrating, resonating, pulsating, or acoustic device that generates perturbations tuned to the instability frequency band of the boundary layer or any frequency, which affect the vortex wake pattern.

To create the perturbations tuned to a frequency within the instability frequency band, the frequency would be selected beforehand and FDD 330 would be set to vibrate, resonate, pulse, or otherwise create perturbations that are tuned to the selected frequency.

FIG. 14 shows that by imparting controlled flow perturbations with device 330, the vortex wake pattern (size, intensity, and pattern of the shed vortices 340 and 342) can be altered, possibly by triggering boundary layer instabilities, which may delay the flow separation to points α' (as opposed to only α in FIG. 11) and increase oscillatory lateral forces imposed on the structure. The ability to control the flow perturbations from device 330 allows for the ability to control or influence vortex wake patterns to amplify the displacement of vortex-induced vibrations represented by arrows 350 and 352, respectively.

Figure 15:
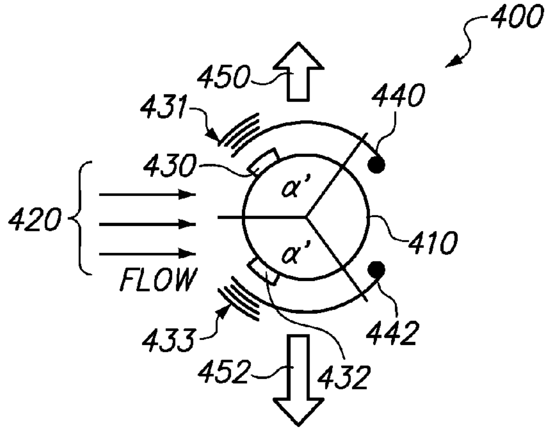
FIG. 15 shows a diagram of a body disposed in a flow field, with a flow disturbance device located on the body, in accordance with the System for Amplifying Flow-Induced Vibration Energy Using Boundary Layer and Wake Flow Control.

FIG. 15 shows a diagram of a system 400 including a body 410 disposed in a flow field 420, with FDDs 430 and 432 located on body 410, in accordance with the System for Amplifying Flow-Induced Vibration Energy Using Boundary Layer and Wake Flow Control. In such configuration, controlled flow disturbances can be imparted directly from the surface of body 410 to the boundary layer, to maximize coupling and amplification of the disturbances directly within the boundary layer. FDDs 430 and 432 may be a fixed or vibrating, resonating, or acoustic device, strip or patch that generates perturbations 431 and 433, respectively, which are tuned to a frequency within the instability frequency band of the boundary layer of body 410. FDDs 430 and 432 are configured such that they do not utilize surface roughness to induce the tuned and controlled flow fluctuations in flow field 420.

To create the perturbations tuned to a frequency within the instability frequency band, the frequency would be selected beforehand and FDD 330 would be set to vibrate, resonate, pulse, or otherwise create perturbations that are tuned to the selected frequency.

FIG. 15 shows that by imparting controlled flow perturbations with FDDs 430 and 432, the vortex wake pattern (size, intensity, and pattern of the shed vortices 440 and 442) can be altered, by triggering boundary layer and/or vortex wake instabilities, which may delay the flow separation to points α' (as opposed to only α in FIG. 11). The ability to control the flow perturbations from FDDs 430 and 432 allows for the ability to control or influence the vortex wake pattern to amplify the displacement of vortex-induced vibrations represented by arrows 450 and 452, respectively.

Many modifications and variations of the System for Amplifying Flow-Induced Vibration Energy Using Boundary Layer and Wake Flow Control are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

I claim:

1. A system comprising:

a body disposed in a flow field having a sub-critical flow rate; and a flow disturbance device, separated from and located proximate to the body such that the flow disturbance device induces tuned and controlled flow fluctuations in the flow field that are coupled into and are naturally amplified by a boundary layer of the body and the flow field, wherein the flow fluctuations are tuned to a frequency within an instability frequency band of the boundary layer, wherein the instability frequency band is a frequency band that naturally amplifies the flow fluctuations and alters the body's downstream vortex shedding pattern such that vortex-induced vibration characteristics experienced by the body are increased.

2. The system of claim 1, wherein the flow disturbance device is located upstream from the body.

3. The system of claim 1, wherein the flow disturbance device is located downstream from the body.

4. The system of claim 1, wherein the flow disturbance device is located transverse to the body.

5. The system of claim 1, wherein the flow disturbance device is a stationary flow disturbance device.

6. The system of claim 1, wherein the flow disturbance device is selected from the group of devices consisting of an oscillating flow disturbance device, a vibrating flow disturbance device, and a resonating flow disturbance device.

7. The system of claim 1, wherein the flow fluctuations are amplified by shear layer instabilities of the boundary layer to increase vortex-induced vibration characteristics experienced by the body.

8. The system of claim 1, wherein the body is an airfoil.

9. The system of claim 1, wherein the body is a bluff body.

10. The system of claim 1, wherein the body is cylindrical in shape.

11. The system of claim 1, wherein the flow field comprises a fluid.

12. The system of claim 1, wherein the flow field comprises a plasma.

13. The system of claim 1, wherein the flow field has flow rate having a Reynolds number of between about 300 and about 300000.

* * * * *